US009105367B2

(12) United States Patent
Childers

(10) Patent No.: US 9,105,367 B2
(45) Date of Patent: *Aug. 11, 2015

(54) DUAL ELLIPTICAL REFLECTOR WITH A CO-LOCATED FOCI FOR CURING OPTICAL FIBERS

(71) Applicant: Phoseon Technology, Inc., Hillsboro, OR (US)

(72) Inventor: Doug Childers, Portland, OR (US)

(73) Assignee: Phoseon Technology, Inc., Hillsboro, OR (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/514,277

(22) Filed: Oct. 14, 2014

(65) Prior Publication Data

US 2015/0028229 A1    Jan. 29, 2015

Related U.S. Application Data

(63) Continuation of application No. 13/619,837, filed on Sep. 14, 2012, now Pat. No. 8,872,137.

(60) Provisional application No. 61/535,318, filed on Sep. 15, 2011.

(51) Int. Cl.
| | | |
|---|---|---|
| *G21K 5/00* | (2006.01) | |
| *C03C 25/12* | (2006.01) | |
| *F26B 13/00* | (2006.01) | |
| *G21K 1/06* | (2006.01) | |

(52) U.S. Cl.
CPC . *G21K 5/00* (2013.01); *C03C 25/12* (2013.01); *F26B 13/00* (2013.01); *G21K 1/067* (2013.01); *G21K 2201/064* (2013.01); *G21K 2201/065* (2013.01)

(58) Field of Classification Search
USPC ..................................... 250/492.1
See application file for complete search history.

(56) References Cited

U.S. PATENT DOCUMENTS

| | | | |
|---|---|---|---|
| 3,984,726 A | | 10/1976 | Ramler |
| 4,636,405 A | * | 1/1987 | Mensah et al. ............. 427/493 |

(Continued)

FOREIGN PATENT DOCUMENTS

| | | |
|---|---|---|
| DE | 19619154 A1 | 6/1997 |
| DE | 10127171 A1 | 12/2001 |

(Continued)

OTHER PUBLICATIONS

Data Sheet for G*SiC Technology Super Blue LEDs No. C430-CB290-E1200, manufactured by Opto Semiconductors, May 1, 1999, 8 pages.

(Continued)

*Primary Examiner* — Phillip A Johnston
(74) *Attorney, Agent, or Firm* — Alleman Hall McCoy Russell & Tuttle LLP

(57) ABSTRACT

A device for UV curing a coating or printed ink on a workpiece such as an optical fiber comprises dual elliptical reflectors arranged to have a co-located focus. The workpiece is centered at the co-located focus such that the dual elliptical reflectors are disposed on opposing sides of the workpiece. Two separate light sources are positioned at a second focus of each elliptical reflector, wherein light irradiated from the light sources is substantially concentrated onto the surface of the workpiece at the co-located focus.

20 Claims, 7 Drawing Sheets

(56) References Cited

U.S. PATENT DOCUMENTS

| | | |
|---|---|---|
| 5,237,917 A | 8/1993 | Traut et al. |
| 5,857,767 A | 1/1999 | Hochstein |
| 6,200,134 B1 | 3/2001 | Kovac et al. |
| 6,345,149 B1 * | 2/2002 | Ervin et al. ............... 392/417 |
| 6,419,749 B1 * | 7/2002 | Rhoades .................... 118/641 |
| 6,457,823 B1 | 10/2002 | Cleary et al. |
| 6,501,084 B1 | 12/2002 | Sakai et al. |
| 6,614,028 B1 | 9/2003 | Cekic et al. |
| 6,626,561 B2 | 9/2003 | Carter et al. |
| 6,692,250 B1 | 2/2004 | Decaudin et al. |
| 6,707,048 B2 | 3/2004 | Hallett et al. |
| 8,251,526 B2 * | 8/2012 | Leonhardt .................. 359/851 |
| 2001/0046652 A1 | 11/2001 | Ostler et al. |
| 2002/0187454 A1 | 12/2002 | Melikechi et al. |
| 2003/0043582 A1 | 3/2003 | Chan et al. |
| 2003/0079501 A1 * | 5/2003 | Lee ............................ 65/382 |
| 2003/0081096 A1 | 5/2003 | Young |
| 2005/0115498 A1 | 6/2005 | Ingram et al. |
| 2011/0147356 A1 | 6/2011 | Leonhardt et al. |
| 2013/0025152 A9 * | 1/2013 | Karlicek et al. .............. 34/275 |

FOREIGN PATENT DOCUMENTS

| | | |
|---|---|---|
| EP | 0660148 A1 | 6/1995 |
| EP | 0879582 A2 | 11/1998 |
| EP | 1158761 A1 | 11/2001 |
| JP | S6161668 A | 3/1986 |
| JP | H07104217 A | 4/1995 |
| KR | 20030013752 A | 2/2003 |
| WO | 9507731 A1 | 3/1995 |
| WO | 0059671 A1 | 10/2000 |
| WO | 0067048 A2 | 11/2000 |
| WO | 0131976 A1 | 5/2001 |
| WO | 0211640 A2 | 2/2002 |
| WO | 0213231 A2 | 2/2002 |
| WO | 03023875 A2 | 3/2003 |
| WO | 2010039945 A2 | 4/2010 |

OTHER PUBLICATIONS

Data Sheet for 5.0 mm Blue Series LEDs No. LNG992CFB, manufactured by the Panasonic Corporation, Mar. 2001, 1 page.

Data Sheet for 3.0 mm Blue Series LEDs No. LNG997CKB, manufactured by the Panasonic Corporation, Mar. 2001, 1 page.

Data Sheet for G*SiC Technology Ultraviolet LEDs No. C395-XB290-E0400, manufactured by Cree, Inc., Available as Early as Jul. 2001, 2 pages.

ISA Korea, International Search Report and Written Opinion Issued in Application No. PCT/US2012/055799, Feb. 27, 2013, WIPO, 10 pages.

Database WPI, Week 198619, Jan. 1, 1986, Thomson Scientific, London, GB; AN 1986-122384, XP002739175, 1 page.

European Patent Office, Extended European Search Report Issued in Patent Application No. 12832516.4, May 18, 2015, Germany, 7 pages.

\* cited by examiner

DUAL ELLIPTICAL REFLECTOR WITH A CO-LOCATED FOCI FOR CURING OPTICAL FIBERS

CROSS REFERENCE TO RELATED APPLICATIONS

The present application is a continuation of U.S. patent application Ser. No. 13/619,837, entitled "DUAL ELLIPTICAL REFLECTOR WITH A CO-LOCATED FOCI FOR CURING OPTICAL FIBERS," and filed on Sep. 14, 2012, which claims priority to U.S. Provisional Patent Application No. 61/535,318, entitled "DUAL ELLIPTICAL REFLECTORS WITH CO-LOCATED FOCI FOR CURING OPTICAL FIBERS," and filed on Sep. 15, 2011, the entire contents of each of which are hereby incorporated by reference for all purposes.

BACKGROUND AND SUMMARY

Optical fibers are used ubiquitously in lighting and imaging applications, as well as in the telecommunication industry, where they provide higher data transmission rates over longer distances as compared to electric wiring. In addition, optical fibers are more flexible, lighter, and can be drawn into thinner diameters than metal wiring, allowing for higher-capacity bundling of fibers into cables. Surface coatings, applied via an ultra-violet (UV) curing process, are employed to protect optical fibers from physical damage and moisture intrusion, and to maintain their long-term durability in performance.

Carter et al. (U.S. Pat. No. 6,626,561) addresses UV curing uniformity issues for optical fibers having surfaces that are located outside a focal point of a UV curing device employing an elliptical reflector to direct UV light from a single UV light source positioned at a second focal point of the elliptical reflector, to the surface of the optical fiber. Curing uniformity issues can arise due to imprecise alignment of the optical fiber relative to the light source, or an irregular-shaped optical fiber. To address these issues, Carter uses a UV lamp structure employing an elliptical reflector to irradiate optical fiber surfaces positioned in the vicinity of a second elliptical reflector focal point with UV light from a single light source positioned in the vicinity of a first elliptical reflector focal point, wherein both the optical fiber and bulb are displaced slightly from the focal points. In this manner, the UV light rays reaching the surface of the optical fiber are dispersed, and the irradiation and curing of the optical coating can potentially be more uniform.

The inventor herein has recognized a potential issue with the above approach. Namely, by displacing the UV light source and the optical fiber away from the focal points of the elliptical reflector, the intensity of UV light irradiating the optical fiber surfaces is dispersed and reduced, thereby lowering the curing and production rates, and imparting higher manufacturing costs.

One approach that addresses the aforementioned issues includes a UV curing device, comprising dual elliptical reflectors having a co-located focus, and arranged on opposing sides of a workpiece, and two UV light sources, wherein each light source is located at a second focus of each elliptical reflector. In this manner, it is possible to irradiate optical fibers or other workpieces with UV light both uniformly and with high intensity, providing rapid and uniform cure of optical fiber coatings.

It will be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
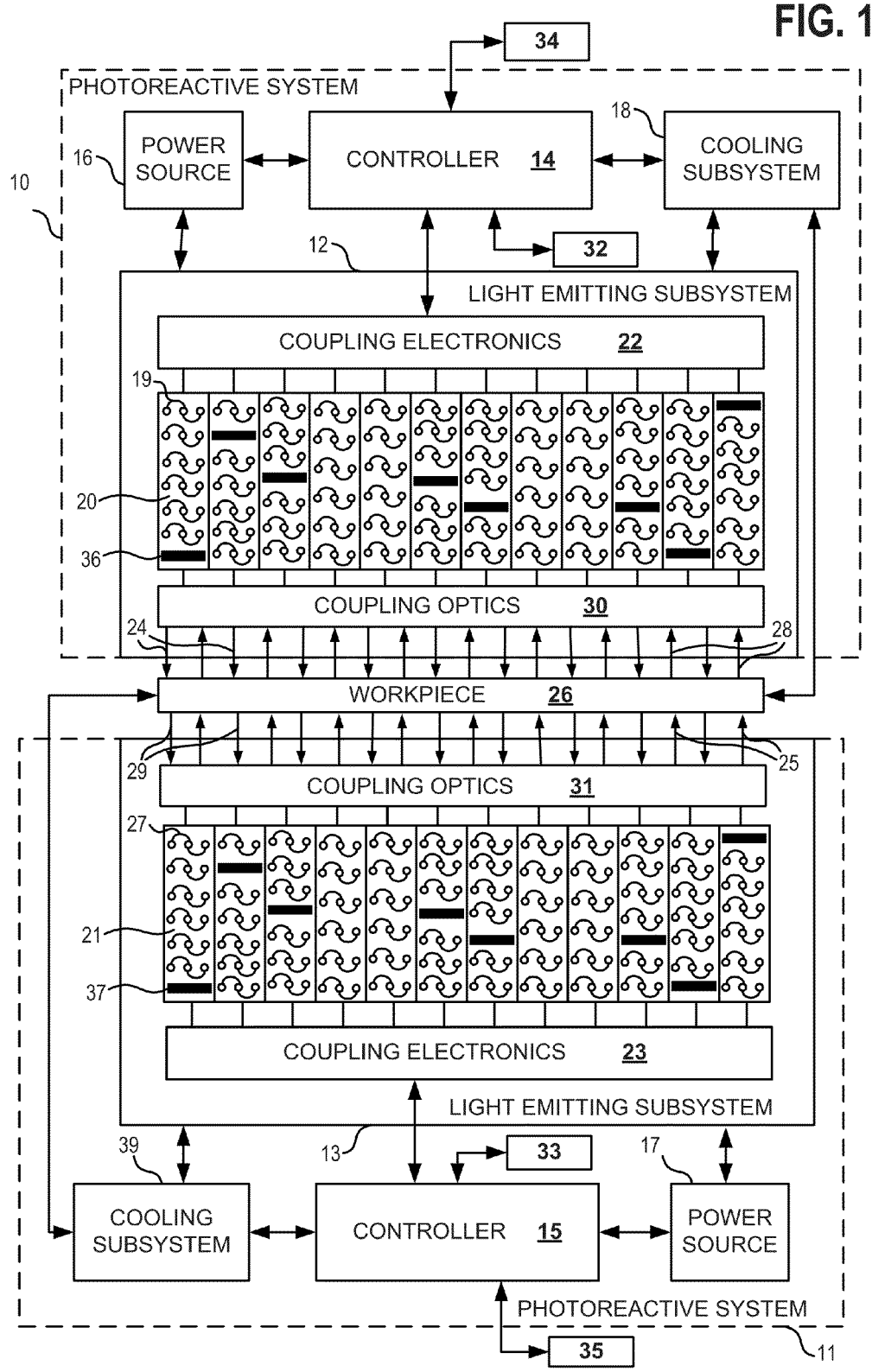
FIG. 1 illustrates an example of dual photoreactive systems, each comprising a power source, controller, cooling subsystem, and a light emitting subsystem.
Figure 2:
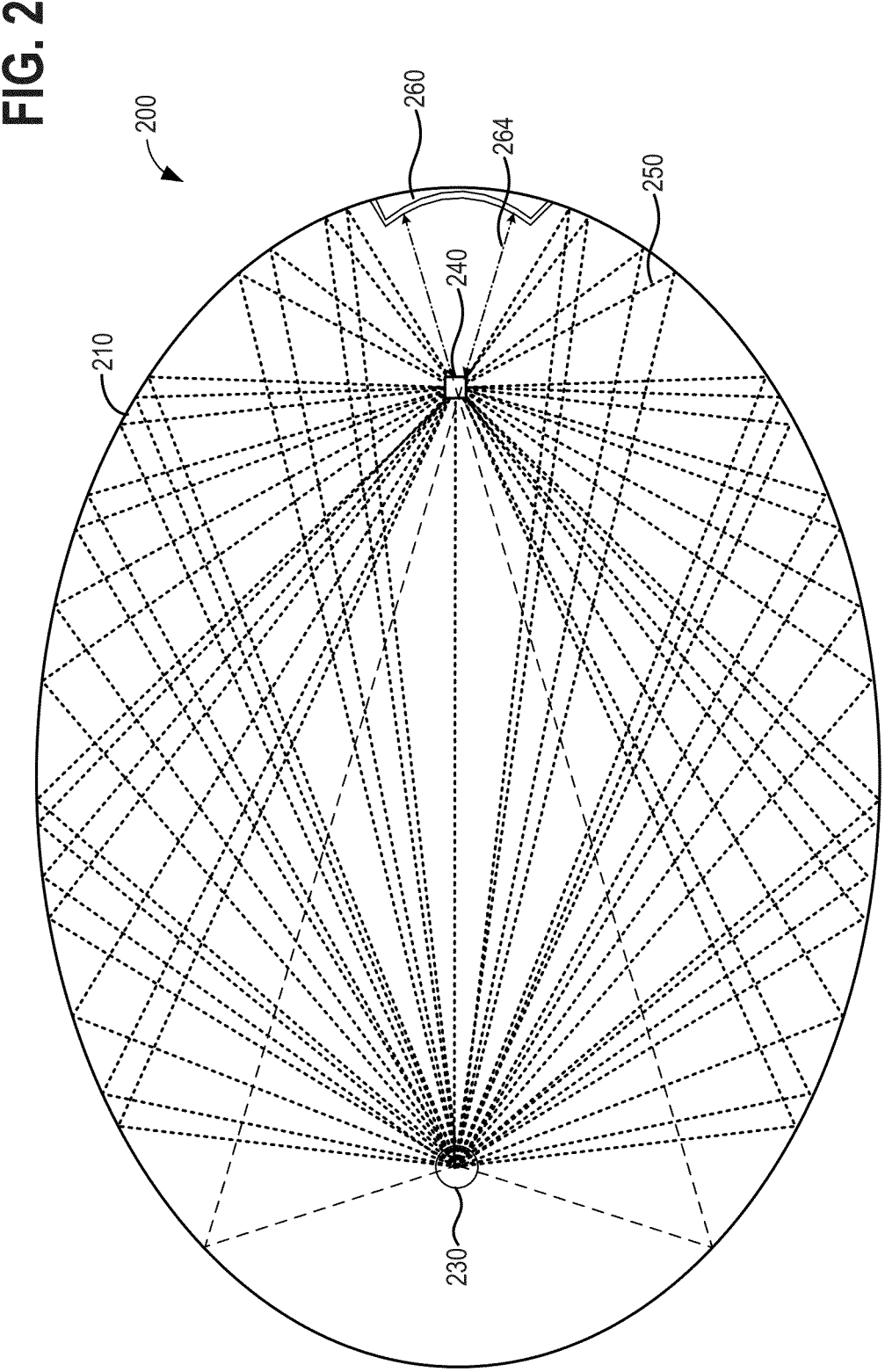
FIG. 2 is an example illustrating a cross-section of a conventional elliptical reflector for a UV curing device with a single light source.
Figure 3:
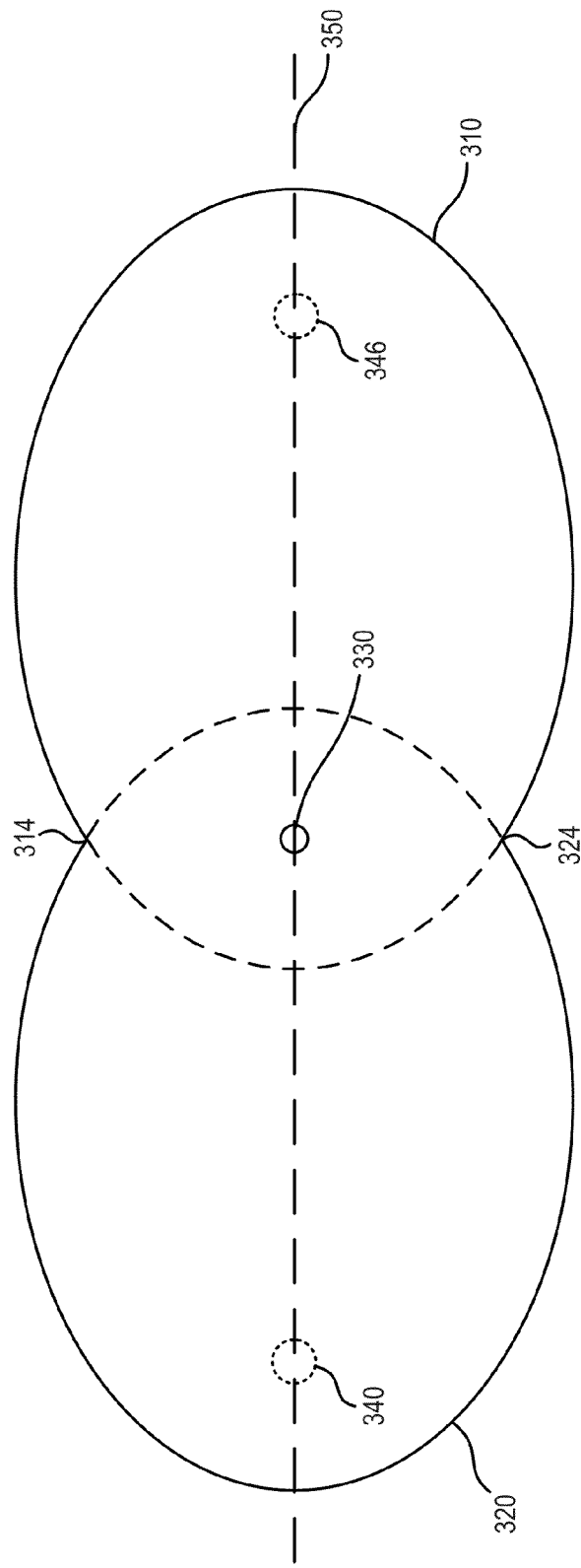
FIG. 3 is an example illustrating a cross-section of two elliptical surfaces arranged with a co-located focus.
Figure 4:
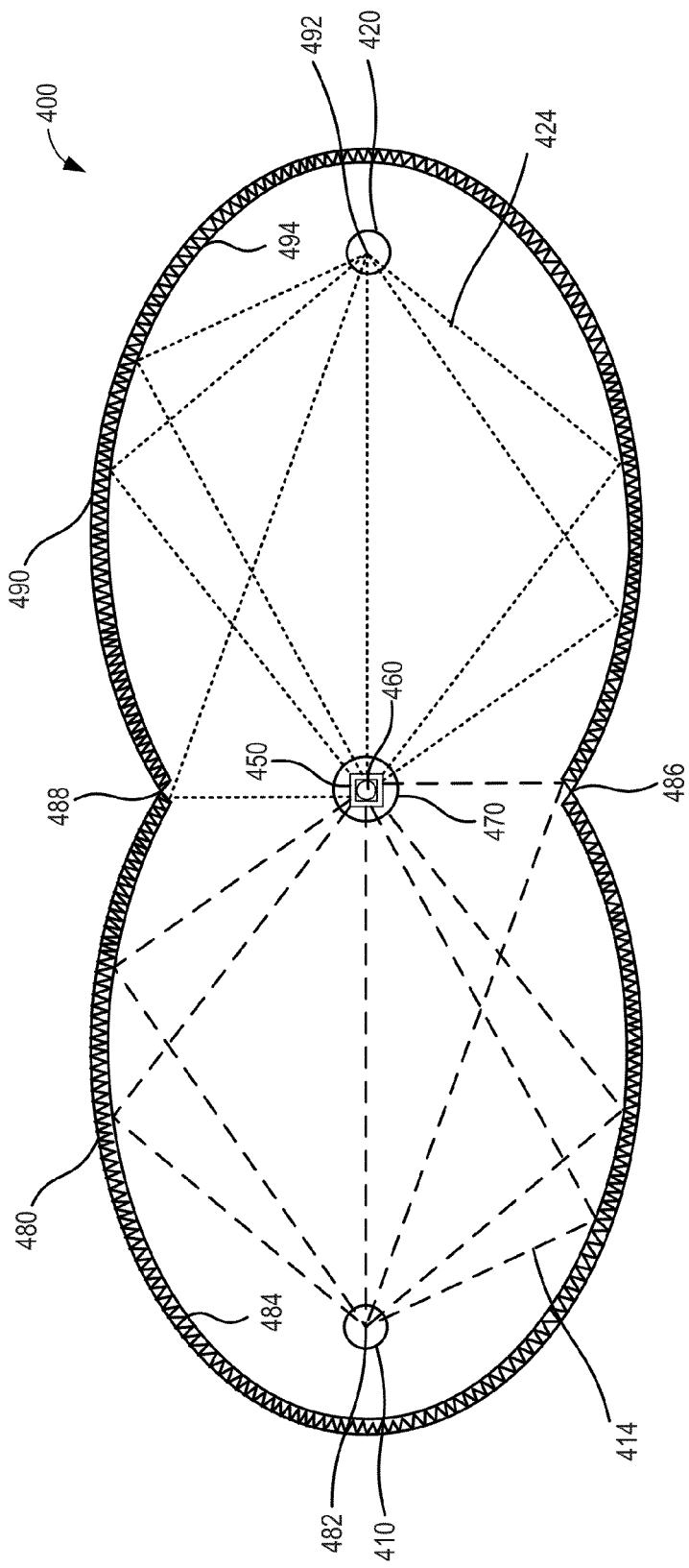
FIG. 4 is an example configuration illustrating a cross-section of dual elliptical reflectors arranged to have a co-located focus.
Figure 5:
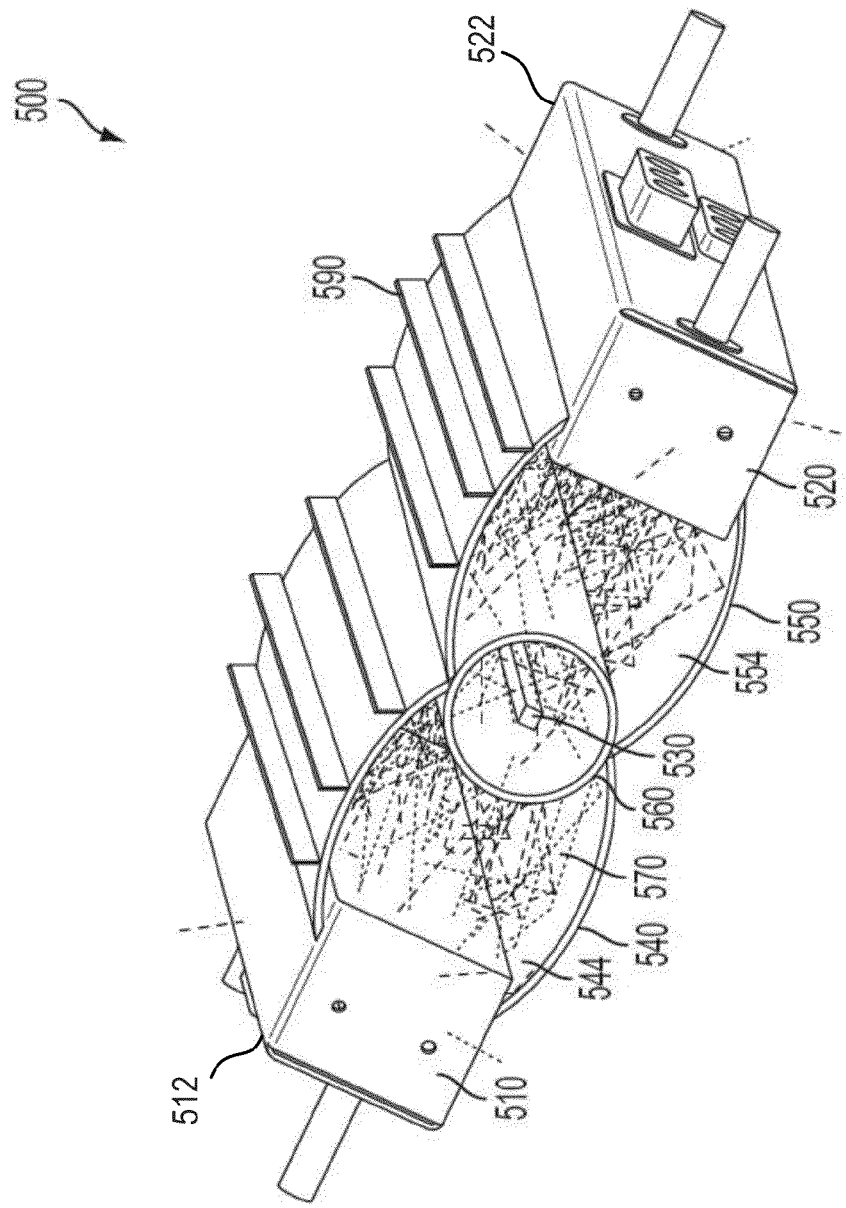
FIG. 5 is a plan-view of an example UV curing device including dual elliptical reflectors, and two LED array light sources.
Figure 6:
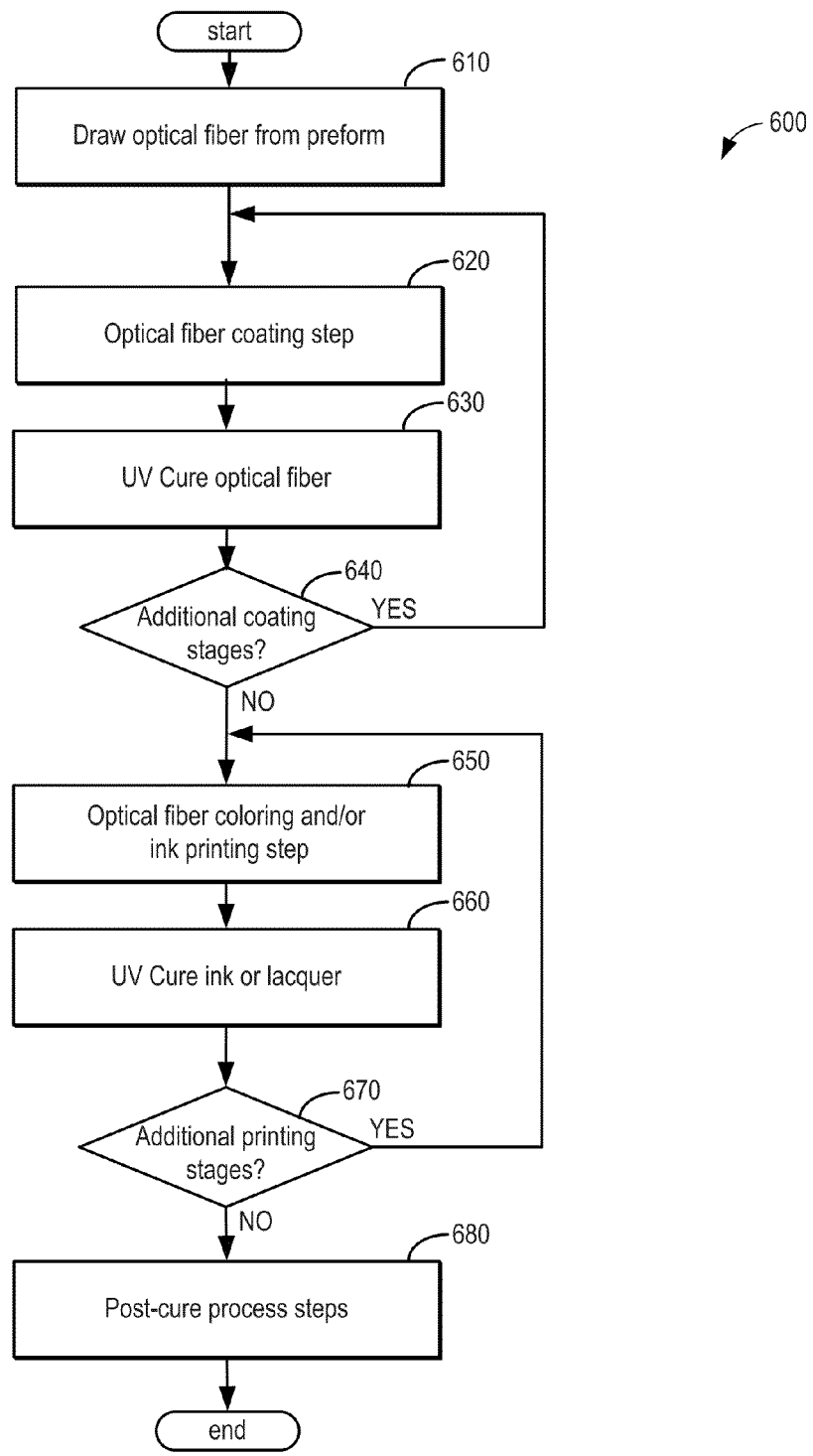
FIG. 6 is a flowchart of an example method of UV curing a workpiece such as an optical fiber using the example UV curing device shown in FIG. 5.
Figure 7:
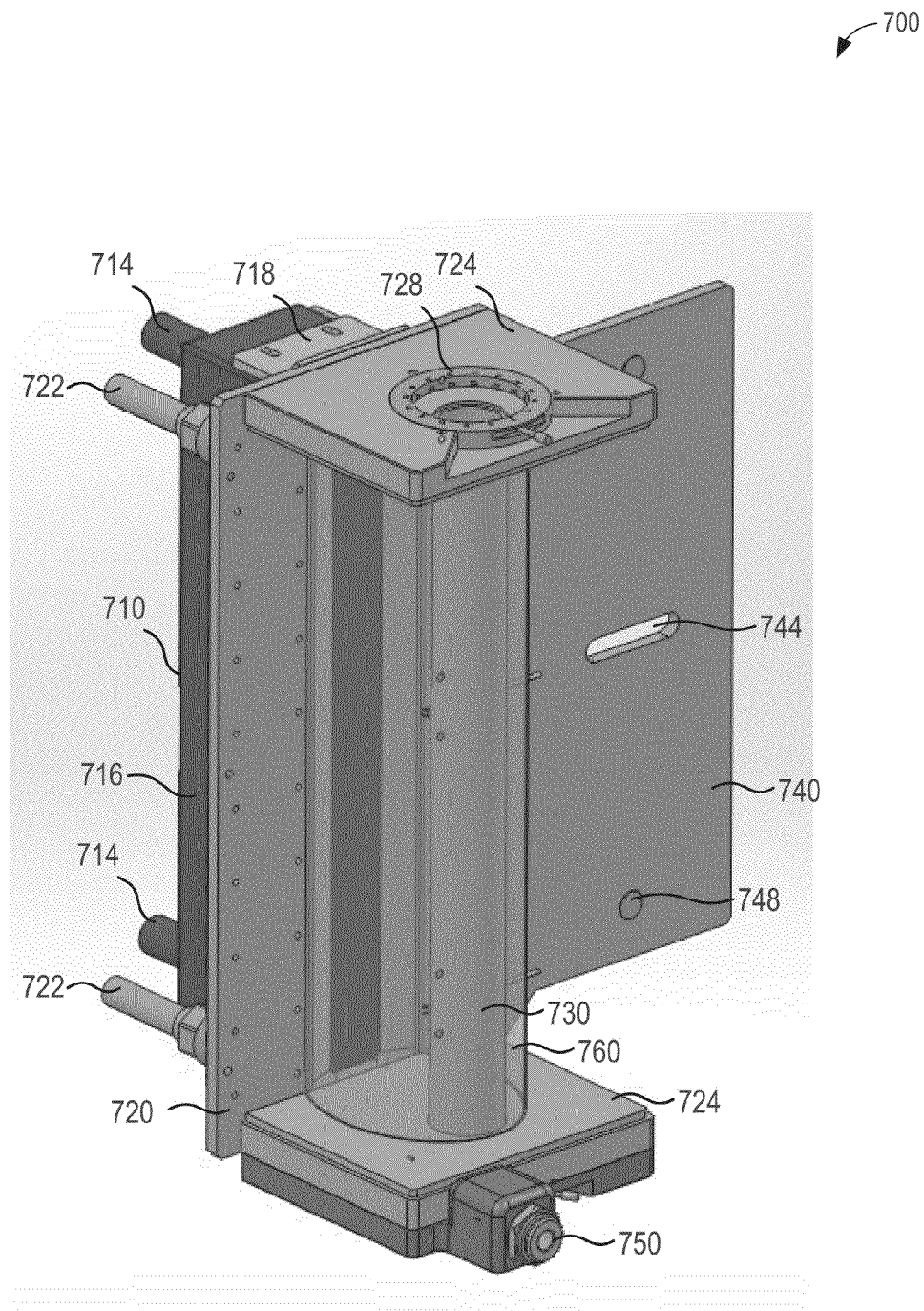
FIG. 7 is a plan view of an example UV curing system.

The present description is for a UV curing device, method and system for use in manufacturing coated optical fibers, ribbons, cables, and other workpieces. Optical fiber coatings may be UV-cured via a UV curing device employing dual elliptical reflectors arranged to have a co-located focus, wherein the workpiece (e.g., the optical fiber) is positioned at the co-located focus, and two UV light sources are located at the second focus of each elliptical reflector. FIG. 1 illustrates an example of dual UV curing devices (e.g., photoreactive systems) including a UV curing device, coupling optics and coupling electronics. FIG. 2 shows a single elliptical reflector coupling optics configuration of a conventional UV curing device for UV curing optical fibers. FIG. 3 illustrates an example of two elliptical surfaces arranged to have a co-located focus. FIG. 4 illustrates a dual elliptical reflector coupling optics configuration of a UV curing device, wherein the dual elliptical reflectors have a co-located focus. FIG. 5 illustrates an example UV curing device, including dual elliptical reflectors arranged to have a co-located focus, and configured with two LED array light sources, and external fins for dissipating heat. FIG. 6 is a flowchart showing steps of an example method for UV curing an optical fiber or other workpiece using the example UV curing device of FIG. 5. FIG. 7 illustrates an example of a UV curing system.

A UV curing device may comprise at least two photoreactive systems, including at least two elliptical reflectors, and at least two light sources. Referring now to FIG. 1, it illustrates a block diagram for an example configuration comprising dual photoreactive systems 10 and 11. In this example, photoreactive systems are disposed on opposing sides of a UV-curable workpiece. In a first example, the photoreactive systems being disposed on opposing sides of a UV-curable workpiece can include being positioned oppositely, or at an orientation of 180° relative to one another, as shown in FIG. 1. In another example, the photoreactive systems being disposed on opposing sides of a UV-curable workpiece can include being positioned at an orientation of at least 90°-270° relative to one another, or 175°-185° relative to one another.

In one example, photoreactive systems 10 and 11 each comprise a light emitting subsystem 12 and 13, a controller 14 and 15, a power source 16 and 17 and a cooling subsystem 18 and 39, respectively.

The light emitting subsystems 12 and 13 may comprise a plurality of semiconductor devices 19 and 27, respectively. Semiconductor devices 19 and 27 may be LED devices, for example. Selected of the plurality of semiconductor devices 19 and 27 may be implemented to provide radiant output 24 and 25, respectively. The radiant output 24 may be directed to a workpiece 26. Returned radiation 28 and 29 may be directed back to the light emitting system 12 and 13 respectively from the workpiece 26 (e.g., via reflection of the radiant output 24 and 25).

The radiant output 24 and 25 may be directed to the workpiece 26 via coupling optics 30 and 31. The coupling optics 30 and 31, if used, may be variously implemented. As an example, the coupling optics may include one or more layers, materials or other structures interposed between the semiconductor devices 19 and 27, providing radiant output 24 and 25 to surfaces of the workpiece 26. As an example, the coupling optics 30 and 31 may include a micro-lens array to enhance collection, condensing, collimation or otherwise the quality or effective quantity of the radiant output 24 and 25. As another example, the coupling optics 30 and 31 may include a micro-reflector array. In employing such a micro-reflector array, each semiconductor device providing radiant output 24 and 25 may be disposed in a respective micro-reflector, on a one-to-one basis. As another example, an array of semiconductor devices 20 and 21 or an array of arrays of semiconductor devices 20 and 21 providing radiant output 24 and 25 may be disposed in macro-reflectors, on a many-to-one basis. In this manner, coupling optics 30 may include both micro-reflector arrays, wherein each semiconductor device is disposed on a one-to-one basis in a respective micro-reflector, and macro-reflectors wherein the quantity and/or quality of the radiant output 24 and 25 from the semiconductor devices is further enhanced, as stated above, by macro-reflectors.

Each of the layers, materials or other structure of coupling optics 30 and 31 may have a selected index of refraction. By properly selecting each index of refraction, reflection at interfaces between layers, materials and other structures in the path of the radiant output 24 and 25 (and/or returned radiation 28, 29) may be selectively controlled. As an example, by controlling differences in such indexes of refraction at a selected interface disposed between the semiconductor devices to the workpiece 26, reflection at that interface may be reduced or increased so as to enhance the transmission of radiant output at that interface for ultimate delivery to the workpiece 26. For example, the coupling optics may include a dichroic reflector where certain wavelengths of incident light are absorbed, while others are reflected and focused to the surface of workpiece 26.

The coupling optics 30 and 31 may be employed for various purposes. Example purposes include, among others, to protect the semiconductor devices 19 and 27, to retain cooling fluid associated with the cooling subsystem 18 and 39, to collect, condense and/or collimate the radiant output 24 and 25, to collect, direct or reject returned radiation 28 and 29, or for other purposes, alone or in combination. As a further example, the photoreactive systems 10 and 11 may employ coupling optics 30 and 31 so as to enhance the effective quality or quantity of the radiant output 24 and 25, particularly as delivered to the workpiece 26.

Selected of the plurality of semiconductor devices 19 and 27 may be coupled to the controllers 14 and 15 via coupling electronics 22 and 23, so as to provide data to the controllers 14 and 15. As described further below, the controller may also be implemented to control such data-providing semiconductor devices, e.g., via the coupling electronics 22 and 23. The controller 14 and 15 may be connected to, and may be implemented to control, each of the power sources 16 and 17, and the cooling subsystems 18 and 39. Moreover, the controllers 14 and 15 may receive data from power sources 16 and 17 and cooling subsystems 18 and 39. In a further example, controllers 14 and 15 may communicate with each other (not shown in FIG. 1) to control operation of photoreactive systems 10 and 11. For example, controllers 14 and 15 may operate in a master-slave cascading control algorithm, where the setpoint of one of the controllers is set by the output of the other controller. Other control strategies for operation of photoreactive system 10 in conjunction with photoreactive system 11 may also be used.

In addition to the power sources 16 and 17, cooling subsystems 18 and 39, and light emitting subsystems 12 and 13, the controllers 14 and 15 may also be connected to, and implemented to control internal elements 32 and 33, and external elements 34 and 35. Elements 32 and 33, as shown, may be internal to the photoreactive systems 10 and 11. Elements 34 and 35, as shown, may be external to the photoreactive systems 10 and 11, but may be associated with the workpiece 26 (e.g., handling, cooling or other external equipment) or may be otherwise related to the photoreaction that photoreactive systems 10 and 11 support.

The data received by the controllers 14 and 15 from one or more of the power sources 16 and 17, the cooling subsystems 18 and 39, the light emitting subsystems 12 and 13, and/or elements 32 and 33, and 34 and 35, may be of various types. As an example the data may be representative of one or more characteristics associated with coupled semiconductor devices 19 and 27, respectively. As another example, the data may be representative of one or more characteristics associated with the respective light emitting subsystems 12 and 13, power sources 16 and 17, cooling subsystems 18 and 39, internal elements 32 and 33, and external elements 34 and 35 providing the data. As still another example, the data may be representative of one or more characteristics associated with the workpiece 26 (e.g., representative of the radiant output energy or spectral component(s) directed to the workpiece). Moreover, the data may be representative of some combination of these characteristics.

The controllers 14 and 15, in receipt of any such data, may be implemented to respond to that data. For example, responsive to such data from any such component, the controllers 14 and 15 may be implemented to control one or more of the power sources 16 and 17, cooling subsystems 18 and 39, light emitting subsystems 12 and 13 (including one or more such coupled semiconductor devices), and/or the elements 32, 33, 34, and 35. As an example, responsive to data from the light emitting subsystem indicating that the light energy is insufficient at one or more points associated with the workpiece, the controller 14 may be implemented to either (a) increase the power source's supply of power to one or more of the semiconductor devices, (b) increase cooling of the light emitting subsystem via the cooling subsystem 18 (e.g., certain light emitting devices, if cooled, provide greater radiant output), (c) increase the time during which the power is supplied to such devices, or (d) a combination of the above.

Individual semiconductor devices 19 and 27 (e.g., LED devices) of the light emitting subsystems 12 and 13 may be controlled independently by controllers 14 and 15. For example, controllers 14 and 15 may control a first group of one or more individual LED devices to emit light of a first intensity, wavelength, and the like, while controlling a second group of one or more individual LED devices to emit light of a different intensity, wavelength, and the like. The first group of one or more individual LED devices may be within the same array of semiconductor devices 20 and 21, or may be from more than one array of semiconductor devices 20 and 21. Arrays of semiconductor devices 20 and 21 may also be controlled independently by controllers 14 and 15 from other arrays of semiconductor devices 20 and 21 in light emitting subsystems 12 and 13 by controllers 14 and 15 respectively. For example, the semiconductor devices of a first array may be controlled to emit light of a first intensity, wavelength, and the like, while those of a second array may be controlled to emit light of a second intensity, wavelength, and the like.

As a further example, under a first set of conditions (e.g. for a specific workpiece, photoreaction, and/or set of operating conditions) controllers 14 and 15 may operate photoreactive systems 10 and 11 to implement a first control strategy, whereas under a second set of conditions (e.g. for a specific workpiece, photoreaction, and/or set of operating conditions) controllers 14 and 15 may operate photoreactive systems 10 and 11 to implement a second control strategy. As described above, the first control strategy may include operating a first group of one or more individual semiconductor devices (e.g., LED devices) to emit light of a first intensity, wavelength, and the like, while the second control strategy may include operating a second group of one or more individual LED devices to emit light of a second intensity, wavelength, and the like. The first group of LED devices may be the same group of LED devices as the second group, and may span one or more arrays of LED devices, or may be a different group of LED devices from the second group, but the different group of LED devices may include a subset of one or more LED devices from the second group.

The cooling subsystems 18 and 39 may be implemented to manage the thermal behavior of the light emitting subsystems 12 and 13. For example, the cooling subsystems 18 and 39 may provide for cooling of light emitting subsystems 12 and 13, and more specifically, the semiconductor devices 19 and 27. The cooling subsystems 18 and 39 may also be implemented to cool the workpiece 26 and/or the space between the workpiece 26 and the photoreactive systems 10 and 11 (e.g., the light emitting subsystems 12 and 13). For example, cooling subsystems 18 and 39 may be an air or other fluid (e.g., water) cooling system. Cooling subsystem may also include cooling elements such as cooling fins attached to the semiconductor devices 19 and 27, or arrays 20 and 21 thereof, or to the coupling optics 30 and 31. For example, cooling subsystem may include blowing cooling air over the LED reflectors (e.g., coupling optics 30 and 31), wherein the reflectors are equipped with external fins to enhance heat transfer.

The photoreactive systems 10 and 11 may be used for various applications. Examples include, without limitation, curing applications ranging from ink printing to the fabrication of DVDs and lithography. The applications in which the photoreactive systems 10 and 11 may be employed can have associated operating parameters. That is, an application may have associated operating parameters as follows: provision of one or more levels of radiant power, at one or more wavelengths, applied over one or more periods of time. In order to properly accomplish the photoreaction associated with the application, optical power may need to be delivered at or near the workpiece 26 at or above one or more predetermined levels of one or a plurality of these parameters (and/or for a certain time, times or range of times).

In order to follow an intended application's parameters, the semiconductor devices 19 and 27 providing radiant output 24 and 25 may be operated in accordance with various characteristics associated with the application's parameters, e.g., temperature, spectral distribution and radiant power. At the same time, the semiconductor devices 19 and 27 may have certain operating specifications, which may be associated with the semiconductor devices' fabrication and, among other things, may be followed in order to preclude destruction and/or forestall degradation of the devices. Other components of the photoreactive systems 10 and 11 may also have associated operating specifications. These specifications may include ranges (e.g., maximum and minimum) for operating temperatures and applied electrical power, among other parameter specifications.

Accordingly, the photoreactive systems 10 and 11 may support monitoring of the application's parameters. In addition, the photoreactive systems 10 and 11 may provide for monitoring of semiconductor devices 19 and 27, including their respective characteristics and specifications. Moreover, the photoreactive systems 10 and 11 may also provide for monitoring of selected other components of the systems 10 and 11, including their characteristics and specifications.

Providing such monitoring may enable verification of the system's proper operation so that operation of photoreactive systems 10 and 11 may be reliably evaluated. For example, photoreactive systems 10 and 11 may be operating improperly with respect to one or more of the application's parameters (e.g. temperature, spectral distribution, radiant power, and the like), any component's characteristics associated with such parameters and/or any component's respective operating specifications. The provision of monitoring may be responsive and carried out in accordance with the data received by the controllers 14 and 15 from one or more of the system's components.

Monitoring may also support control of the system's operation. For example, a control strategy may be implemented via the controllers 14 and 15, the controllers 14 and 15 receiving and being responsive to data from one or more system components. This control strategy, as described above, may be implemented directly (e.g., by controlling a component through control signals directed to the component, based on data respecting that components operation) or indirectly (e.g., by controlling a component's operation through control signals directed to adjust operation of other components). As an example, a semiconductor device's radiant output may be adjusted indirectly through control signals directed to the power sources 16 and 17 that adjust power applied to the light emitting subsystems 12 and 13 and/or through control signals directed to the cooling subsystems 18 and 39 that adjust cooling applied to the light emitting subsystems 12 and 13.

Control strategies may be employed to enable and/or enhance the system's proper operation and/or performance of the application. In a more specific example, control may also be employed to enable and/or enhance balance between the array's radiant output and its operating temperature, so as, e.g., to preclude heating the semiconductor devices 19 and 27 or array of semiconductor devices 20 and 21 beyond their specifications while also directing radiant energy to the workpiece 26 sufficient to properly complete the photoreaction(s) of the application.

In some applications, high radiant power may be delivered to the workpiece 26. Accordingly, the light emitting subsystems 12 and 13 may be implemented using arrays of light emitting semiconductor devices 20 and 21. For example, the subsystems 12 and 13 may be implemented using a highdensity, light emitting diode (LED) array. Although LED arrays may be used and are described in detail herein, it is understood that the semiconductor devices 19 and 27, and arrays 20 and 21 of same, may be implemented using other light emitting technologies without departing from the principles of the invention; examples of other light emitting technologies include, without limitation, organic LEDs, laser diodes, other semiconductor lasers.

Continuing with FIG. 1, the plurality of semiconductor devices 19 and 27 may be provided in the form of arrays 20 and 21, or an array of arrays (e.g., as shown in FIG. 1). The arrays 20 and 21 may be implemented so that one or more, or most of the semiconductor devices 19 and 27 are configured to provide radiant output. At the same time, however, one or more of the array's semiconductor devices 19 and 27 may be implemented so as to provide for monitoring selected of the array's characteristics. The monitoring devices 36 and 37 may be selected from among the devices in the array and, for example, may have the same structure as the other, emitting devices. For example, the difference between emitting and monitoring may be determined by the coupling electronics 22 and 23 associated with the particular semiconductor device (e.g., in a basic form, an LED array may have monitoring LED devices where the coupling electronics provides a reverse current, and emitting LED devices where the coupling electronics provides a forward current).

Furthermore, based on coupling electronics, selected of the semiconductor devices in the array may be either/both multifunction devices and/or multimode devices, where (a) multifunction devices may be capable of detecting more than one characteristic (e.g., either radiant output, temperature, magnetic fields, vibration, pressure, acceleration, and other mechanical forces or deformations) and may be switched among these detection functions in accordance with the application parameters or other determinative factors and (b) multimode devices may be capable of emission, detection and some other mode (e.g., off) and may be switched among modes in accordance with the application parameters or other determinative factors.

As described above, photoreactive systems 10 and 11 may be configured to receive a workpiece 26. As an example, workpiece 26 may be a UV-curable optical fiber, ribbon, or cable. Furthermore, workpiece 26 may be positioned at or near the foci of coupling optics 30 and 31 of photoreactive systems 10 and 11 respectively. In this manner, UV light irradiated from photoreactive systems 10 and 11 may be directed via coupling optics to the surface of the workpiece for UV curing and driving the photoreactions thereat. Further still, coupling optics 30 and 31 of photoreactive systems 10 and 11 may be configured to have a co-located focus, as will be further described below.

Turning now to FIG. 2, it illustrates an example of a single elliptical reflector 200. Single elliptical coupling optics are used in conventional UV curing devices for curing coatings of optical fiber workpieces.

An ellipse is a plane curve that results from the intersection of a cone by a plane in a way that produces a closed curve, and is defined as the locus of all points of the plane whose distances to two fixed points (the foci of the ellipse) add to the same constant. The distance between antipodal points on the ellipse, or pairs of points whose midpoint is at the center of the ellipse, is maximum along its major axis or transverse diameter, and a minimum along its perpendicular minor axis or conjugate diameter. An ellipse is symmetric about its major and minor axes. The foci of the ellipse are two special points on the ellipse's major axis and are equidistant from the center point of the ellipse (where the major and minor axes intersect). The sum of the distances from any point on the ellipse to those two foci is constant and equal to the major axis. Each of these two points is called a focus of the ellipse. An elliptic cylinder is a cylinder having an elliptical cross section.

An elliptical reflector 200 may be an elliptic cylinder having an elliptical cross section. An elliptical reflector 200, thus has two foci, wherein light irradiated from one focus and along the axial length of the elliptic cylinder will be concentrated at the second focus along the axial length of the cylinder. Elliptical reflector surface 210 is an example of a light control device having an elliptic cylindrical shape and elliptical cross section, such that light rays 250 emanating from a single light source 230 at a first focal point (e.g., a focal point along an axis of the elliptic cylinder) of the elliptical reflector are directed to a second focal point 240 (e.g., a focal point along a second axis of the elliptic cylinder). For UV curing, the interior surface of the elliptical reflector may be UV-reflective, to direct UV light substantially onto the surface of a workpiece located at the second focal point 240.

In single elliptical reflector devices with a single light source, the near-field workpiece surfaces (e.g., workpiece surfaces facing toward the light source) may receive light at higher intensities than the far-field workpiece surfaces (e.g., workpiece surfaces facing away from the light source). As such, single elliptical reflectors may also include a cylindrical back auxiliary reflector 260 in order to help in focusing UV light rays 264 emanating from light source 230 and being directed onto the far-field surface of the workpiece. Use of back auxiliary reflectors may be used thereby to provide for more uniform irradiation of a workpiece.

As described above, a conventional single elliptical reflector 200 has two foci, wherein light initiating from a light source 230 at a first focal point may be substantially concentrated at a second focal point 240.

Turning now to FIG. 3, it illustrates an example of two elliptical surfaces 310 and 320 that overlap and are connected forming a union of two partial elliptical surfaces. The ends at which the two partial elliptical surfaces are united form two edges 314 and 324 near the midpoints of the otherwise curved elliptical arcs. As shown in FIG. 3, elliptical surfaces 310 and 320 may be aligned about their major axes 350, and arranged such that they substantially share a co-located focus 330. Elliptical surfaces 310 and 320 may be disposed on opposing sides of the workpiece positioned at or in the vicinity of the substantially co-located focus. Furthermore two or more light sources may be positioned at or in the vicinity or encompassing foci 340 and 346 on opposing sides of the workpiece. The light sources may, for example, be individual LED devices, arrays of LED devices, or arrays of LED arrays. In this arrangement, the dual elliptical surfaces can substantially concentrate light irradiated from light sources positioned at, or in the vicinity of, foci 340 and 346 of the dual elliptical reflectors onto the surfaces of the workpiece.

Because at least two light sources are used in conjunction with dual elliptical reflectors, the surfaces of the workpiece that are far-field relative to one light source, may be near-field relative to another light source. As such the dual elliptical reflector design can potentially avoid using back reflectors, simplifying system design and cost. In this manner, the configuration exemplified in FIG. 3 can also potentially achieve higher irradiation intensity and more uniform irradiation intensity across the workpiece surfaces relative to conventional single elliptical reflector UV curing devices. Achieving higher and more uniform irradiation intensity may potentially allow for increased production rates and/or shorter curing times, thereby reducing product manufacturing costs.

A further potential advantage of dual elliptical reflectors relative to single elliptical reflectors is that UV light from two light sources can be concentrated more uniformly across all surfaces of the workpiece, while maintaining high intensity as compared to conventional single elliptical UV curing devices. Furthermore because multiple light sources are used, light irradiated from the light sources can substantially be directed to the surface of the workpiece, even when there may be slight misalignment of the workpiece from the co-located focus, or slight misalignment of one or more light sources from one of the foci. Furthermore, in cases where the cross section of the workpiece may be irregularly shaped or asymmetrical, or in cases where the workpiece cross section may be large, light irradiated from the light sources can be substantially directed to the surface of the workpiece, when multiple light sources are used in conjunction with dual elliptical reflectors.

Use of at least two light sources also imparts more flexibility in controlling the intensity and spectral wavelengths of the irradiated light. For example the intensities and bulb types of the two light sources can be varied independently, or they can be matched. Use of multiple light sources can also provide some fail-safe redundancy, in case of failure or malfunction of one of the light sources during operation.

Elliptical surfaces 310 and 320 may be substantially elliptical, or at least partially elliptical, wherein the dual reflectors form substantially elliptic cylinders, and wherein light irradiated at or in the vicinity of foci 340 and 346 are reflected at the interiors of surfaces 310 and 320 substantially at co-located focus 330. For example, the shapes of surfaces 310 and 320 may depart slightly from perfectly elliptical without substantially compromising the convergence of light irradiated by light sources near or at foci 340 and 346 at co-located focus 330. As a further example, shapes of surfaces 310 and 320 departing slightly from perfectly elliptical can include faceted elliptical surfaces, wherein the general shape of the reflectors may be elliptical, but with individual sections faceted to slightly depart from an ellipse. Faceted or partially faceted elliptical surfaces may potentially allow for control of reflected light in a manner that enhances light uniformity or intensity at the workpiece surface for a given light source. Each of the facets may be flat, with corners connecting a plurality of the flat facets to form the elliptical surface. Alternatively, the facets may have a curved surface.

Turning now to FIG. 4, it illustrates a cross-section of an example of coupling optics for a UV curing device 400 including dual elliptical reflectors 480 and 490 aligned about their major axes and arranged such that they share a co-located focus 460, as in the arrangement of the two elliptical surfaces 310 and 320 in FIG. 3. UV curing device 400 may also comprise two light sources 410 and 420 positioned near or at the other foci of the elliptical reflectors 480 and 490, and a sample tube 470 positioned so that its central axis is substantially centered about the co-located focus. UV curing device 400 may also comprise more than two light sources. In this manner, the elliptical reflectors 480 and 490 form two partial elliptic cylinders joined at edges 486 and 488 where the elliptical reflectors 480 and 490 meet. UV curing device 400 may further be configured to receive a workpiece 450, wherein the workpiece 450 may pass inside the sample tube 470, so that its axis extends along the axis of the co-located focus 460. In this configuration, wherein the two light sources and the dual elliptical reflectors are disposed on opposing sides of the workpiece, the dual elliptical reflectors can substantially focus and direct light rays 414 and 424 irradiated from the two light sources 410 and 420 onto the workpiece surfaces in a substantially uniform manner and with high intensity. Herein, irradiating the workpiece in a substantially uniform manner may refer to irradiating all of the workpiece surfaces contained within the UV curing device with essentially the same irradiance (e.g., power per unit area). Furthermore, because the two light sources and the dual elliptical reflectors are positioned on opposing sides of the workpiece, the surfaces of the workpiece comprise near-field or mid-field surfaces relative to at least one of the two light sources. As such, far-field surfaces can potentially be eliminated, precluding using back reflectors or reflective surfaces other than the interior surfaces of the dual elliptical reflectors to direct the light onto the workpieces.

Dual elliptical reflectors 480 and 490 can include a reflective interior surface 484 and 494 for directing light rays 414 and 424 emanating from light sources 410 and 420. The reflective interior surfaces 484 and 494 may reflect visible and/or UV and/or IR light rays with minimal absorption or refraction of light. Alternately, the reflective interior surfaces 484 and 494 may be dichroic such that a certain range of wavelengths of light may be reflected, whereas light of wavelengths outside a certain range may be absorbed at the reflective interior surfaces 484 and 494. For example, the reflective interior surfaces 484 and 494 may be designed to reflect UV and visible light rays, but absorb IR light rays. Such a reflective interior surface may be potentially useful for heat sensitive coatings or workpieces, or to moderate the rate and uniformity of the curing reaction at the surface of workpiece 450. On the other hand, the reflective interior surfaces 484 and 494 may preferentially reflect both UV and IR since curing reactions can proceed more rapidly at higher temperatures.

Workpiece 450 can include optical fibers, ribbons or cables having a range of sizes and dimensions. Workpiece 450 may also include a UV-curable cladding and/or surface coating, as well as UV-curable ink printed on its surface. UV-curable cladding can include one or more UV-curable polymer systems, and may also include more than one UV-curable layer, that may be UV-curable in one or more curing stages. UV-curable surface coatings may include a thin film, or an ink that is curable on the surface of the optical fiber or optical fiber cladding. For example, the workpiece may be an optical fiber comprising a core and cladding layer, and the cladding may include a coating comprising a UV-curable polymer such as a polyimide or acrylate polymer, or another one or more UV-curable polymers. As another example, a dual-layer coating may also be used, wherein the workpiece may be coated with an inner layer that may have a soft and rubbery quality when cured for minimizing attenuation by microbending, and an outer layer, which may be stiffer and suited for protecting the workpiece (e.g. optical fiber) from abrasion and exposure to the environment (e.g., moisture, UV). The inner and outer layers may comprise a polymer system, for example an epoxy system, comprising initiators, monomers, oligomers, and other additives.

During curing, the workpiece 450 may be pulled or drawn through the UV curing device in the axial direction, inside the sample tube 470, wherein the workpiece 450 is axially centered substantially about the co-located focus 460. Furthermore, the sample tube 470 may be axially centered about the co-located focus 460, and may concentrically surround the workpiece 450. Sample tube 470 may be constructed of glass, or quartz or another optically and/or UV and/or IR transparent material, and may not be overly thick in dimension, such that the sample tube 470 does not block or substantially interfere with the light rays irradiated from light sources 410 and 420 and directed from the interior surface of dual elliptical reflectors 480 and 490 through the sample tube onto the surfaces of workpiece 450. Sample tube 470 may have a circular cross-section, as shown in FIG. 4, or may possess another suitably shaped cross-section. Sample tube 470 may also contain an inerting gas such as nitrogen, carbon dioxide, helium, and the like, in order to sustain an inert atmosphere around the workpiece and to reduce oxygen inhibition, which may slow the UV curing reaction.

Light sources 410 and 420 may include one or more of semiconductor devices or arrays of semiconductor devices such as LED light sources, LED array light sources, or microwave-powered, or halogen arc light sources, or arrays thereof. Furthermore, light sources 410 and 420 substantially located at foci 482 and 492, may extend along the axial length of the foci 482 and 492, so as to extend along the length of the partial elliptic cylindrical reflector portions of the UV curing device 400. Light sources 410 and 420, particularly arrays of light sources, or arrays of arrays of light sources, may further encompass or extend beyond foci 482 and 492 along or at points along the length of the partial elliptic cylindrical reflector portions of UV curing device 400. In this manner, light irradiated from light sources 410 and 420 along the axial length of the dual elliptical reflectors is substantially redirected to the surface of workpiece 450 along its entire length.

Furthermore, light sources 410 and 420 may emit one or more of visible, UV, or IR light. Further still, light sources 410 and 420 may be identical or different types of light sources. For example, light source 410 may irradiate UV light and light source 420 may irradiate IR light. As another example, light source 410 may irradiate UV light of a first spectrum, while light source 420 may irradiate UV light of a second spectrum. The first and second spectrums emitted by light sources 410 and 420 may or may not overlap. For example, if the first light source 420 is a first type of LED light source and the second light source is a second type of LED light source, then their emission spectra may or may not overlap. Furthermore, the intensities of light irradiated by light source 410 and light source 420 may be identical or they may be different, and their intensities can be independently controlled by an operator via a controller (e.g. 14, 15) or coupling (e.g., 22, 23) electronics. In this manner, both the light intensity and wavelengths of light sources 410 and 420 can be flexibly and independently controlled for achieving uniform UV irradiation and UV cure of a workpiece. For instance, if a workpiece is irregularly shaped, and/or is not symmetrical about the co-located focus of the dual elliptical reflector, the UV curing device may irradiate one portion of the workpiece differentially from another portion to achieve uniform cure. As another example if different coatings or inks are applied to the surface of the workpiece, the UV curing device may irradiate one portion of the workpiece differentially from another portion.

In a UV curing device with dual elliptical reflectors 480 and at least two light sources 410 and 420 each positioned at a focus of the elliptical reflectors, a workpiece positioned at the co-located focus 460 may be irradiated with UV light more uniformly and at higher intensities, as compared to conventional UV curing devices employing only one elliptical reflector and a single light source, as illustrated in FIG. 2. In this manner, UV curing a workpiece using dual elliptical reflectors 480 and 490 and two light sources 410 and 420 each positioned at a focus of the elliptical reflectors may achieve faster curing rates and more uniform cure of the workpiece. In other words, faster curing rates can be achieved while achieving more uniform cure. Non-uniform or unevenly coated workpieces may potentially experience non-uniform forces when the coating expands or contracts. For the case of an optical fiber, non-uniformly coated optical fibers can be more susceptible to greater signal attenuation. Achieving more uniform cure may include higher percent conversion of reactive monomer and oligomer, and higher degree of cross-linking in the polymer system, in addition to achieving concentric coatings around the workpiece (e.g., an optical fiber) that have constant thickness and are continuous over the application length of the workpiece (e.g., an optical fiber).

Achieving faster curing rates in a continuous or batch manufacturing process of optical fibers, cables, ribbons, or the like, may potentially reduce the manufacturing time and costs. Furthermore, achieving more uniform cure may potentially impart higher durability and strength to the workpiece. In the case of an optical fiber coating, increased coating uniformity may potentially preserve the fiber strength, thereby potentially increasing the durability of the optical fiber with respect to preventing attenuation of signal transmission due to phenomena such as microbending deformations, stress corrosion, or other mechanical damage in the optical fiber. Higher degrees of cross-linking may also potentially increase the chemical resistance of the coating, preventing chemical penetration and chemical corrosion or damage of the optical fiber. Optical fibers may be severely degraded by surface defects. With conventional UV curing devices, faster curing rates can be achieved, but only at the expense of reduced cure uniformity; similarly, more uniform cure can be achieved, but only at the expense of lowering curing rates.

As such, a UV curing device, may comprise at least two elliptic cylindrical reflectors arranged to have a co-located focus, and at least two UV light sources, wherein each light source may be located at a second focus of each of the at least two elliptical reflectors. The at least two elliptical reflectors may be configured to receive a UV-curable workpiece, and may be arranged on opposing sides of the workpiece. The elliptic surfaces of the at least two elliptic cylindrical reflectors can meet and join to form top and bottom edges near a midpoint of the UV curing device. Furthermore, the elliptic surfaces may extend along an axial length of the elliptic cylindrical reflectors, wherein the elliptic surfaces of the elliptic cylindrical reflectors may extend outward from the edges to either side of the UV curing device where the elliptic cylindrical reflectors attach to housings for the two or more light sources. The light sources may comprise a power source, a controller, a cooling subsystem, and a light emitting subsystem, the light emitting subsystem including coupling electronics, coupling optics and a plurality of semiconductor devices. The housings may contain the light sources and include inlets and outlets for cooling subsystem fluid.

The cooling subsystem may comprise a circulating cooling fluid for dissipating heat from the UV curing device, and can further comprise cooling fins mounted on the outside surface of the elliptic cylindrical reflectors. Furthermore, dual elliptical reflectors may include dichroic reflectors. The semiconductor devices of the at least two UV light sources may comprise LED arrays, and microwave-powered UV lamps, and may emit UV light with different peak wavelengths.

Turning now to FIG. 5, it illustrates an example light emitting subsystem of a UV curing device 500 including the features discussed above in FIG. 3. UV curing device 500 includes coupling optics (e.g., dual elliptical reflectors 540 and 550), two light sources 510 and 520, and a workpiece 530 (e.g. an optical fiber) positioned at a co-located focus of the coupling optics (e.g., dual elliptical reflectors). Surrounding the workpiece is a cylindrical concentric sample tube 560. Sample tube 560 may be a quartz sample tube, for example, and may be purged or filled with an inerting atmosphere such as nitrogen, carbon dioxide, helium, or other inert gas. Sample tube 560 may also include sample tubes of non-cylindrical geometries or non-quartz materials provided that the UV light passes substantially through the sample tube without interference (e.g. absorption or reflection) from the sample tube such that substantially all of the UV light is directed to the surfaces of the workpiece. Sample tube 560 may also contain an inerting gas such as nitrogen, carbon dioxide, helium, and the like, in order to sustain an inert atmosphere around the workpiece and to reduce inhibition by oxygen, which may potentially slow the UV curing reaction The reflective interior surfaces 544 and 554 of dual elliptical reflectors may reflect visible and/or UV and/or IR light rays with minimal absorption or refraction of light. Alternately, the reflective interior surfaces 544 and 554 may be dichroic such that a certain range of wavelengths of light may be reflected, whereas light of wavelengths outside a certain range may be absorbed at the reflective interior surfaces 544 and 554. For example, the reflective interior surfaces 544 and 554 may be designed to reflect UV and visible light rays, but may absorb IR light rays. Such a reflective interior surface may be potentially useful for heat sensitive coatings or workpieces, or to moderate the rate and uniformity of the curing reaction at the surface of workpiece 530. On the other hand, the reflective interior surfaces 544 and 554 may preferentially reflect both UV and IR since curing reactions can proceed more rapidly at higher temperatures.

Various processes or methods may be used to manufacture dual elliptical reflectors 540 and 550, depending on application parameters such as heat load, precision, cost, and the like. The dual elliptical reflectors 540 and 550 may be machined or cast from metal, or machined or molded from glass, ceramic, and/or plastic formed and combined with a high reflectance coating. Furthermore, the dual elliptical reflectors 540 and 550 may include external surfaces that are designed for heat transfer cooling of the UV curing system. For example, the external surfaces may be ridged to increase heat transfer, and may also include cooling fins 590 attached to the external surfaces of dual elliptical reflectors 540 and 550. Additional cooling elements as part of a cooling subsystem 18 (not shown in FIG. 5) may also be provided by convection of cooling air or other inert fluids over one or more surfaces of the dual elliptical reflector.

Light sources 510 and 520 may be UV LED array light sources that emit UV light from a second focal point of each elliptical reflector, such that the emitted UV light rays 570 are directed by the elliptical reflectors onto the surface of the workpiece. Light sources 510 and 520 may further be positioned at or near the second focal point, or may encompass or extend beyond the second focal point, such that emitted UV light rays 570 are directed by the elliptical reflectors substantially onto the surface of the workpiece. In FIG. 5, the UV LED array light sources 510 and 520 extend along the second focal point of each elliptical reflector in the axial direction of the workpiece 530 and UV curing device 500, such that uniform high intensity UV light is directed onto the surface of the workpiece along entire length of the workpiece contained inside the UV curing device 500. The UV curing process may be a continuous manufacturing process and the entire length of the workpiece 530 (e.g. an optical fiber) may not be contained within the UV curing device 500. For example, portions of the optical fiber downstream of UV curing device 500 may be involved in downstream process steps such as coextrusion of cabling or sheathing or other process steps. Furthermore, portions of the optical fiber upstream of UV curing device 500 may be involved in upstream process steps such as drawing and coating. Further still, the optical fiber manufacturing process may comprise several stages of UV curing, wherein groups of UV curing devices 500 arranged in a linear fashion are used to define each curing stage. For example, between each curing stage, there could be additional coating steps, or other process steps.

Light sources 510 and 520 may include one or more of LED light sources, LED array light sources, microwave-powered, or halogen arc light sources. Furthermore, light sources 510 and 520 may emit one or more of visible, UV, or IR light. Further still, light sources 510 and 520 may be identical or different types of light sources. For example, light source 510 may irradiate UV light and light source 520 may irradiate IR light. As another example, light source 510 may irradiate UV light of a first spectrum, while light source 520 may irradiate UV light of a second spectrum. The first and second spectrums emitted by light sources 510 and 520 may or may not overlap. For example, if the first light source 520 is a first type of LED light source and the second light source is a second type of LED light source, then their emission spectra may or may not overlap. Furthermore, the intensities of light irradiated by light source 510 and light source 520 may be identical or they may be different, and their intensities can be independently controlled by an operator. In this manner, both the light intensity and wavelengths of light sources 510 and 520 can be flexibly and independently controlled for achieving uniform UV irradiation and UV cure of a workpiece. For instance, if a workpiece is irregularly shaped, and/or is not symmetrical about the co-located focus of the dual elliptical reflector, the UV curing device may irradiate one portion of the workpiece differentially from another portion to achieve uniform cure. As another example if different coatings or inks are applied to the surface of the workpiece, the UV curing device may irradiate one portion of the workpiece differentially from another portion to achieve uniform cure.

In this manner, wherein the two light sources and the dual elliptical reflectors are disposed on opposing sides of the workpiece, the dual elliptical reflectors can direct light irradiated from the two light sources onto the workpiece surfaces in a substantially uniform manner and with high intensity. Irradiating the workpiece in a substantially uniform manner may include irradiating all of the workpiece surfaces contained within the UV curing device with the same irradiance (e.g., power per unit area). Furthermore, because the two light sources and the dual elliptical reflectors are positioned on opposing sides of the workpiece, the surfaces of the workpiece are positioned near-field or mid-field relative to at least one of the two light sources. As such, far-field surfaces may be substantially eliminated, and using back reflectors or reflective surfaces other than the interior surfaces of the dual elliptical reflectors to focus the light onto far-field surfaces of the workpiece can potentially be avoided, thereby simplifying the design and lowering the cost of the UV curing system. UV curing device 500 may also comprise other components not shown in FIG. 5 such as a power supply. Furthermore, light sources 510 and 520 may be attached to the elliptical reflectors 540 and 550 via the housings 512 and 522 for the light sources. For example, the housings 512 and 522 for light sources 510 and 520 may be mechanically fastened to the elliptical reflectors 540 and 550 via a faceplate, for example as shown in FIG. 7.

Thus, a photoreactive system for UV curing may include a power supply, a cooling subsystem, a light emitting subsystem comprising coupling optics, including at least two elliptic cylindrical reflectors having a co-located focus, and arranged on opposing sides of a workpiece, and two UV LED array light sources, wherein each UV LED array light source is located substantially at a second focus of each of the dual elliptical reflectors; and a controller. The controller may include instructions executable to irradiate UV light from the two UV light sources, wherein each UV light source is located at a focus of the elliptic cylindrical reflectors, and wherein the irradiated UV light is reflected by the elliptic cylindrical reflectors and focused on to the surface of the optical fiber.

The coupling optics may further comprise a quartz tube surrounding the workpiece, and axially centered about the co-located focus, wherein the quartz tube is purged with an inert gas in order to mitigate oxidative inhibition of the UV curing reaction. Further still, the cooling subsystem may include cooling fins attached to the external surface of the elliptic cylindrical reflectors.

Turning now to FIG. 6, it illustrates a method 600 of curing a workpiece, for example an optical fiber, optical fiber coating, or another type of workpiece. Method 600 begins at step 610, which can include first drawing the optical fiber from a preform in a fiber drawing step. Method 600 then continues at step 620 where the fiber is coated with a UV-curable coating or polymer system using a predetermined coating process.

Next, method 600 proceeds with step 630, wherein the coated optical fiber may be UV-cured. During the UV curing step 630, the optical fiber may be pulled through the sample tube of one or a plurality UV curing devices 500 arranged linearly in series, during which UV light is irradiated from the LED array light sources 510 and 520 of the UV curing devices and directed by the dual elliptical reflectors 540 and 550 onto the surface of the optical fiber at the co-located focus. The linear speed at which the optical fiber may be pulled can be very fast, and may exceed 20 m/s, for example. Arranging a plurality of UV curing devices in series may thus allow the coated length of optical fiber to receive a long enough UV exposure residence time in order to substantially complete curing of the optical fiber coating. Complete UV curing of the optical fiber coating may impart physical and chemical properties such as strength, durability, chemical resistance, fatigue strength, and the like. Incomplete or inadequate curing may degrade product performance qualities and other properties that can potentially cause premature failure and loss of performance of the optical fiber. In some examples, the effective length of the UV curing stage (for example, the number of UV curing devices 500 arranged in series) is determined by taking into account the manufacturing rate, or draw or linear speed of the optical fiber or workpiece. Thus if the optical fiber linear speed is slower, the length or number of the UV curing system stage may be shorter than for cases where the optical fiber linear speed is faster.

Next, method 600 continues at step 640, where it is determined if additional coating stages are required. In some examples, dual or multi-layer coatings may be applied to the surface of the workpiece, for example an optical fiber. As discussed above, optical fibers can be manufactured to include two protective concentric coating layers. For example, a dual-layer coating may also be used, wherein the workpiece may be coated with an inner layer that may have a soft and rubbery quality when cured for minimizing attenuation by microbending, and an outer layer, which may be stiffer and suited for protecting the workpiece (e.g. optical fiber) from abrasion and exposure to the environment (e.g., moisture, UV). The inner and outer layers may comprise a polymer system comprising initiators, monomers, oligomers, and other additives. If an additional coating step is to be performed, then method 600 returns to step 620 where the optical fiber or other workpiece (now coated with a UV-cured first layer) is coated via an additional coating step 620 followed by an additional UV curing step 630. In FIG. 6, each coating step is shown as the optical fiber coating step 620 for simple illustrative purposes, however, each coating step may not be identical such that each coating step may apply different types of coatings, different coating compositions, different coating thicknesses, and impart different coating properties to the workpiece. In addition the coating process step 620 may use different processing conditions (e.g., temperature, coating viscosity, coating method). Similarly, UV curing of different coating layers or steps can involve variable methods or processing conditions. For example, in different UV cure steps, processing conditions such as UV light intensity, UV exposure time, UV light wavelength spectra, UV light source, and the like may be changed depending on the type of coating and/or coating properties.

Following the one or more coating and curing steps 620 and 630, method 600 may continue at step 650. At step 650, a UV curable ink or lacquer may be printed on the coated optical fiber for example, for coloring or identification purposes. The printing may be carried out using a predetermined printing process, and may involve one or more multiple printing stages or steps. Next, method 600 continues at step 660, where the printed ink or lacquer is UV-cured. Similar to the UV curing step of the one or more optical fiber coatings, the printed ink or lacquer is UV-cured by pulling the optical fiber through the sample tube of one or a plurality of UV curing devices 500 arranged linearly in series, during which UV light is irradiated from the LED array light sources 510 and 520 of the UV curing device 500 and directed by the dual elliptical reflectors 540 and 550 onto the surface of the optical fiber at the co-located focus. The linear speed at which the optical fiber may be pulled can be very fast, and may exceed 20 m/s, for example. Arranging a plurality of UV curing devices in series may thus allow the printed ink or lacquer along the length of optical fiber to receive a long enough UV exposure residence time in order to substantially complete curing of the printed ink or lacquer. In some examples, the effective length of the UV curing stage (for example, the number of UV curing devices 500 arranged in series) is determined by taking into account the manufacturing rate, or draw or linear speed of the optical fiber or workpiece. Thus if the optical fiber linear speed is slower, the length or number of the UV curing system stage may be shorter than for cases where the optical fiber linear speed is faster. In particular, using UV curing device 500 including dual elliptical reflectors with a co-located focus and dual light sources 510 and 520, may potentially provide higher intensity and more uniform UV light irradiated and directed onto the surface of the workpiece, thereby providing both faster and more uniform cure of the workpiece. In this manner, optical fiber coatings and/or inks may be UV-cured at higher production rates, thereby lowering manufacturing costs.

Next, method 600 continues at step 670, where it is determined if additional printing stages are required. For example, it may be desirable to print a first layer of ink or lacquer for identification purposes and then print a second layer of ink or lacquer to protect the first printed layer. If additional printing stages are required, then method 600 returns to step 640 to print and UV-cure the additional printed inks and/or lacquers.

In FIG. 6, each printing step is shown as the optical fiber printing step 650 for simple illustrative purposes, however, each printing step may not be identical such that each printing step may apply different types of inks or lacquers, different ink or lacquer compositions, different ink or lacquer thicknesses, and impart different ink or lacquer properties to the workpiece. In addition the printing process step 620 may use different processing conditions (e.g., temperature, coating viscosity, coating method). Similarly, UV curing of different printed layers or steps can involve variable methods or processing conditions. For example, in different UV cure steps, processing conditions such as UV light intensity, UV exposure time, UV light wavelength spectra, UV light source, and the like may be changed depending on the type of coating and/or coating properties.

If there are no additional printing stages, method 600 continues at step 680 where any post-UV curing process steps are performed. As examples, post-UV curing process steps may include cable or ribbon construction, where a plurality of coated and printed and UV-cured optical fibers are combined into a flat ribbon, or a larger diameter cable composed of multiple fibers or ribbons. Other post-UV curing process steps may include co-extrusion of external cladding or sheathing of cables and ribbons.

In this manner, a method of UV curing a workpiece may comprise drawing the workpiece along a co-located focus of at least two elliptic cylindrical reflectors, and irradiating UV light from at least two UV light sources arranged on opposing sides of the workpiece, wherein each UV light source is located at a second focus of the elliptic cylindrical reflectors, and wherein the irradiated UV light is reflected by the elliptic cylindrical reflectors and focused on to a surface of the workpiece. Drawing the workpiece along the co-located focus may comprise drawing at least one of an optical fiber, ribbon, or cable with at least one of a UV-curable coating, polymer, or ink, through the co-located focus. Furthermore, the irradiated UV light may be irradiated from LED arrays, or microwave-powered UV lamps, and may be reflected by elliptic cylindrical dichroic reflectors. Further still, the two UV light sources may emit UV light with different peak wavelengths.

Cooling fins may be mounted on the external surfaces of the at least two elliptic cylindrical reflectors to dissipate heat. Furthermore, a quartz tube may be axially centered around the co-located focus, thereby surrounding the workpiece, and the quartz tube may purged with an inert gas to mitigate oxidative inhibition of the UV curing reaction.

Turning now to FIG. 7, it illustrates a plan view of an example of a UV curing system 700. UV curing system 700 is shown, for illustrative purposes comprising a single elliptic cylindrical reflector 760, but may also include two or more elliptic cylindrical reflectors, as exemplified in the UV curing device 500 of FIG. 5. Light source 710 may include a housing 716, and inlet and outlet piping connections 714 through which cooling fluid may circulate. Light source 710 may comprise one or more arrays of UV LED's positioned substantially along a first focus of the elliptic cylindrical reflector. UV curing system 700 may further comprise mounting brackets 718 by which the housing 716 may attach to a reflector assembly baseplate 720. UV curing system 700 may also include a sample tube 730 and a workpiece (not shown), for example an optical fiber, that is pulled or drawn within the sample tube 730 and positioned substantially about the central longitudinal axis of the sample tube 730. Longitudinal axis of sample tube 730 may be positioned substantially along a second focus of the elliptic cylindrical reflector, wherein UV light originating from light source 710 may be substantially directed through the sample tube to surfaces of the workpiece by elliptic cylindrical reflector 760. Sample tube 730 may be constructed of quartz, glass or other material, and may have a cylindrical or other geometry, wherein UV light directed onto the external surface of the sample tube 730 may pass through the sample tube 730 without substantial refraction, reflection or absorption.

Reflector assembly baseplate 720 may be connected to reflector assembly faceplates 724, which may be mechanically fastened to either end of elliptic cylindrical reflector 760. Sample tube 730 may also be mechanically fastened to reflector assembly faceplates 724. In this manner, mounting brackets 718, reflector assembly faceplates 724 and reflector assembly baseplate 720 may serve to aid in aligning the light source 710, elliptic cylindrical reflector 760 and sample tube 730, wherein the light originating from light source 710 is substantially positioned about a first focus of elliptic cylindrical reflector 760, wherein the sample tube is substantially positioned about a second focus of elliptic cylindrical reflector 760, and wherein UV light originating from light source 710 may be substantially directed through the sample tube 730 to surfaces of the workpiece by elliptic cylindrical reflector 760. Reflector assembly faceplate 724 may also include an alignment mechanism 728, where the alignment and/or position of the sample tube 730 may be adjusted after the reflector assembly faceplates 724, reflector assembly baseplate 720, elliptic cylindrical reflector 760 and sample tube 730 have been assembled together. Reflector assembly baseplate 720 may also be connected along one side to a reflector assembly mounting plate 740. Reflector assembly mounting plate 740 may further be provided with one or more mounting slots 744 and one or more mounting holes 748 by which UV curing system 700 can be mounted.

UV curing system 700 may also include further connection ports 722 and 750 for other purposes such as for connecting electrical wiring conduits, mounting sensors, and the like.

It will be appreciated that the configurations disclosed herein are exemplary in nature, and that these specific embodiments are not to be considered in a limiting sense, because numerous variations are possible. For example, the above embodiments can be applied to workpieces other than optical fibers, cables, and ribbons. Furthermore, the UV curing devices and systems described above may be integrated with existing manufacturing equipment and are not designed for a specific light source. As described above, any suitable light engine may be used such as a microwave-powered lamp, LED's, LED arrays, and mercury arc lamps. The subject matter of the present disclosure includes all novel and non-obvious combinations and subcombinations of the various configurations, and other features, functions, and/or properties disclosed herein.

Note that the example process flows described herein can be used with various UV curing devices and UV curing system configurations. The process flows described herein may represent one or more of any number of processing strategies such as continuous, batch, semi-batch, and semi-continuous processing, and the like. As such, various acts, operations, or functions illustrated may be performed in the sequence illustrated, in parallel, or in some cases omitted. Likewise, the order of processing is not necessarily called for to achieve the features and advantages of the example embodiments described herein, but is provided for ease of illustration and description. One or more of the illustrated acts or functions may be repeatedly performed depending on the particular strategy being used. It will be appreciated that the configurations and routines disclosed herein are exemplary in nature, and that these specific embodiments are not to be considered in a limiting sense, because numerous variations are possible. The subject matter of the present disclosure includes all novel and non-obvious combinations and subcombinations of the various systems and configurations, and other features, functions, and/or properties disclosed herein.

The following claims particularly point out certain combinations and subcombinations regarded as novel and non-obvious. These claims may refer to "an" element or "a first" element or the equivalent thereof. Such claims are to be understood to include incorporation of one or more such elements, neither requiring nor excluding two or more such elements. Other combinations and subcombinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A UV curing device, comprising:
   two cylindrical reflectors that overlap and are connected to form a union of two at least partially elliptical surfaces, the surfaces united to form top and bottom edges near a midpoint of the otherwise curved union of the surfaces, each cylindrical reflector having a first focus and a second focus, the first foci of the cylindrical reflectors being co-located;
   at least two UV light sources including a UV light source located at each of the second foci, wherein light reflected from interior surfaces of the at least two cylindrical reflectors is focused at the co-located first foci; and
   a sample tube axially centered around the co-located first foci and configured to receive a workpiece.

2. The UV curing device of claim 1, wherein the surfaces are at least partially faceted.

3. The UV curing device of claim 2, wherein facets of the surfaces are flat, and wherein a plurality of the facets are joined at corners thereof to form each surface.

4. The UV curing device of claim 2, wherein the facets of the surfaces are curved.

5. The UV curing device of claim 1, wherein intensities and bulb types of the two light sources are varied independently.

6. The UV curing device of claim 1, wherein each UV light source comprises a plurality of semiconductor devices, with each semiconductor device disposed in a respective micro-reflector.

7. The UV curing device of claim 1, wherein each UV light source comprises an array of semiconductor devices disposed in a macro-reflector.

8. The UV curing device of claim 1, further comprising inlet and outlet piping connections through which cooling fluid may circulate.

9. The UV curing device of claim 1, wherein the device does not include any back reflectors or reflective surfaces, other than the interior surfaces of the cylindrical reflectors, for directing the light onto the workpiece.

10. A method of UV curing an optical fiber, comprising:
    drawing the optical fiber from a preform;
    coating the optical fiber with a UV-curable coating or polymer system;
    pulling the optical fiber through a sample tube of a UV curing device, the sample tube centered around a co-located focus of at least two elliptic cylindrical reflectors that overlap and are connected to form a union of two partial elliptic surfaces, the surfaces united to form top and bottom edges near a midpoint of the otherwise curved union of the surfaces; and
    UV curing the optical fiber by directing UV light onto a surface of the optical fiber at the co-located focus.

11. The method of claim 10, further comprising:
    after UV curing the optical fiber, coating the optical fiber with an additional UV-curable coating or polymer system, pulling the optical fiber through the sample tube of the UV curing device, and UV curing the optical fiber again by directing UV light onto the surface of the optical fiber at the co-located focus.

12. The method of claim 11, wherein different temperatures, coating viscosities, and/or coating methods are used for different coating stages.

13. The method of claim 11, wherein different light intensities, exposure times, and/or wavelength spectra are used for different UV curing stages.

14. The method of claim 11, wherein coating the optical fiber with a UV-curable coating or polymer system comprises coating the optical fiber with an inner layer, and wherein coating the optical fiber with an additional UV-curable coating or polymer system comprises coating the optical fiber with an outer layer, the outer layer stiffer than the inner layer.

15. The method of claim 14, wherein the inner and outer layers comprise a polymer system comprising initiators, monomers, and oligomers.

16. The method of claim 11, further comprising pulling the optical fiber through a sample tube of each of a plurality of UV curing devices arranged linearly in series, the sample tube of each UV curing device centered around a co-located focus of at least two elliptic cylindrical reflectors that overlap and are connected to form a union of two partial elliptic surfaces, the surfaces united to form top and bottom edges near a midpoint of the otherwise curved union of the surfaces, each UV curing device curing the optical fiber by directing UV light onto the surface of the optical fiber at the co-located focus.

17. The method of claim 15, wherein a number of UV curing devices arranged in series is based on the linear speed at which the optical fiber is pulled.

18. A photoreactive system for UV curing comprising,
    a power supply;
    a cooling subsystem; and
    a plurality of UV curing devices arranged in series, each UV curing device comprising coupling optics including least two elliptic cylindrical reflectors that overlap and are connected to form a union of two partial elliptic surfaces, the surfaces united to form top and bottom edges near a midpoint of the otherwise curved union of the surfaces, each elliptic cylindrical reflector having a first focus and a second focus, the first foci of the elliptic cylindrical reflectors being co-located, each UV curing device further comprising at least two UV light sources including a UV light source located substantially at each of the second foci of the elliptic cylindrical reflectors; and
    a sample tube axially centered around the co-located first foci and configured to receive a workpiece.

19. The system of claim 18, further comprising mounting brackets by which a housing of each UV light source may attach to a reflector assembly baseplate which is connected to reflector assembly faceplates, the reflector assembly faceplates mechanically fastened to either end of each elliptic cylindrical reflector, and the sample tube mechanically fastened to the reflector assembly faceplates.

20. The system of claim 19, wherein each reflector assembly faceplate includes an alignment mechanism for adjusting an alignment and/or position of the sample tube.

* * * * *